(Model.)

G. P. MERRILL.
Device for Unloading Cars.

No. 234,883.   Patented Nov. 30, 1880.

Attest:
J. Walter Fowler
Geo. R. Porter

Inventor:
George P. Merrill,
per Chas. H. Fowler,
Attorney

United States Patent Office.

GEORGE P. MERRILL, OF TOLEDO, OHIO, ASSIGNOR OF THREE-FOURTHS TO PATRICK DOWLING, C. H. COY, AND NATHAN W. DYER, OF SAME PLACE.

DEVICE FOR UNLOADING CARS.

SPECIFICATION forming part of Letters Patent No. 234,883, dated November 30, 1880.

Application filed October 23, 1880. (Model.)

*To all whom it may concern:*

Be it known that I, GEORGE P. MERRILL, a citizen of the United States, residing at Toledo, in the county of Lucas and State of Ohio, have invented certain new and useful Improvements in Devices for Unloading Cars; and I do hereby declare that the following is a full, clear, and exact description of the same, reference being had to the annexed drawings, making a part of this specification, and to the letters and figures of reference marked thereon.

Figure 1:
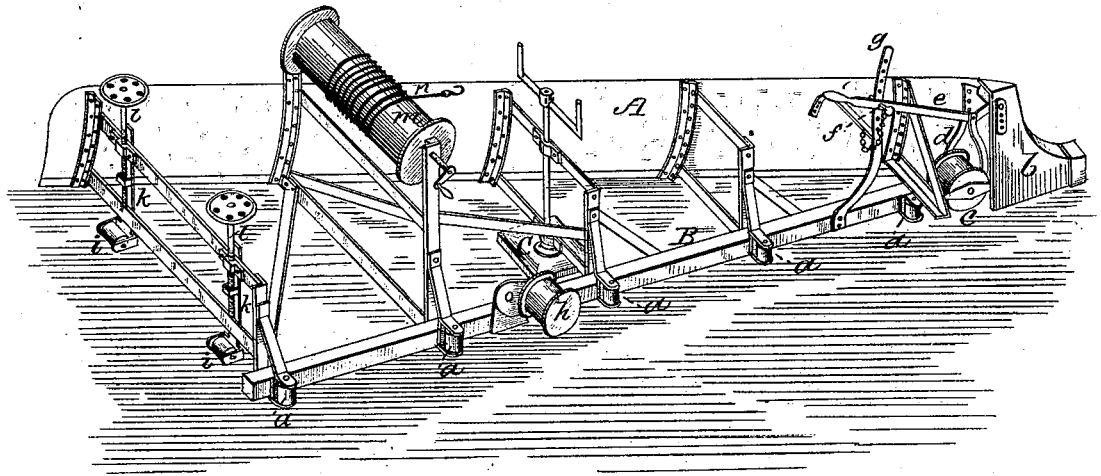
Figure 2:
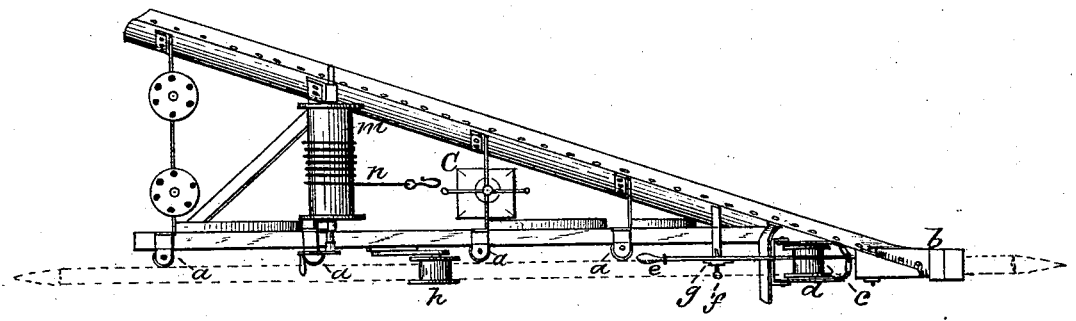
Figure 3:
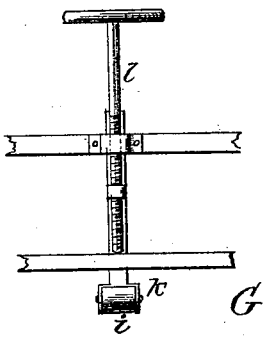

Figure 1 of the drawings is a perspective view of the unloader constructed in accordance with my invention. Fig. 2 is a top-plan view thereof, with the rail shown in dotted lines for guiding the unloader over the platform of the car; and Fig. 3 is a detail view of one of the adjustable rollers connected to the rear of the unloader for the purpose of raising the same off the platform of the car.

This invention has relation to that class of devices employed for the purpose of unloading gravel, dirt, or other material from the ordinary platform-cars used upon railroads.

Previous to my invention these devices were in the form of a prow-shaped scraper, or, in other words, having two inclined sides arranged at an angle to each other and meeting at their forward ends, similar to a double-sided plow. This form of unloader is not adapted to discharge the gravel or dirt from one side only of the platform of the car; but when moved forward along the platform will simultaneously discharge the material from both sides, this being only useful for ballasting or where the material is needed upon both sides of the track.

The object of the present invention is to provide a device for unloading cars of dirt, gravel, or other material that will discharge it from one side only in cases where double tracks are being constructed, new side-tracks, and such work where it is necessary to have the material unloaded from one side only of the track. This object I attain by the device constructed substantially as shown in the drawings, and hereinafter described.

In the accompanying drawings, A represents the inclined scraper, being arranged at an acute angle upon a horizontal plane with the beam B, to which it is connected and braced by a suitable internal frame-work. The scraper A is preferably concave upon its outer side, and at its forward end is the apex of the angle formed by the scraper and beam, and has connected at that point a nose-casting, $b$, which fits over the rail, as shown in dotted lines. This rail, which may be simply a piece of timber, is preferably detachably connected upon the side of the car-platform opposite that side from which the material is to be unloaded, each end of the rail, if desired, having connected thereto a cast shoe to protect it from wear and to enable the unloader to go from one car to another.

The beam B is provided with any suitable number of anti-friction rollers, $a$, which bear against the inner side of the rail.

The scraper A at its forward end has a flanged roller, $c$, having its bearings in a pivoted or hinged frame, $d$, said frame being pivoted to a lever, $e$, the latter also being pivoted to the nose-casting $b$. This construction admits the frame $d$, with its roller $c$, being raised or lowered by the lever $e$, and when at the required height it is held at that position by a pin, $f$, passing through the lever $e$ and one of a series of holes in a standard, $g$.

Although I have described this as one in many means for rendering the roller adjustable and holding it at the required height, I do not, however, desire to be understood as confining myself to such means, as other means may be employed so long as the result is attained. This adjustment of the flanged roller $c$ is to assist the unloader to mount the rail upon the platform of the next car in case the car should be a little higher or not upon the same horizontal plane. It also keeps the unloader while moving upon the rail clear of the car-platform, thereby preventing friction, as does also the adjustable flanged roller $h$ connected to the beam B and resting on the rail of the platform.

To the rear of the unloader are vertically-adjustable rollers $i$, said rollers having their bearings in boxes $k$, which are caused to move up and down by adjusting screw-rods $l$.

Any other means may be employed for regulating the height of the rollers, as found most convenient, the object of said adjustment being to raise the unloader off the platform of the car sufficiently to prevent frictional contact therewith.

A jack, C, is suitably connected to the unloader, and the object thereof is to raise up the same so that it can be easily turned around on the platform of the car in case it is desired to unload from the opposite side thereof.

The unloader is provided with a windlass, m, over which passes a wire cable, n, to be used for drawing the unloader over the platform of the car, one end of said cable being hooked in the clevis of the nose-casting b, while the other end is fastened to the draw-head of the locomotive.

The several details of construction, such as the several rollers and the manner of rendering them adjustable, as well as the nose-casting, jack, and horizontal beam with internal framework, may be variously modified without departing from the principle of my invention, which consists wholly in an unloader that will discharge the gravel, dirt, or other material from one side of the car at a time, instead of discharging it from both sides simultaneously, as heretofore, thereby adapting such devices for use where the double unloaders would be of no use or value whatever.

Having now fully described my invention, what I claim as new, and desire to secure by Letters Patent, is—

1. A device constructed substantially as described, whereby the gravel, dirt, or other material upon the platform of the car is discharged from one side only thereof by the movement of the device along and over the platform, substantially as and for the purpose set forth.

2. A device for unloading cars, having anti-friction rollers connected to the side thereof and vertically-adjustable rollers for raising the device off the platform of the car, substantially as and for the purpose specified.

3. The combination, with a device for unloading cars, of a jack connected thereto for elevating it above the platform of the car, substantially as and for the purpose described.

In testimony that I claim the above I have hereunto subscribed my name in the presence of two witnesses.

GEORGE P. MERRILL.

Witnesses:
   GEO. H. BECKWITH,
   D. L. BROWN.